US012598696B2

(12) United States Patent
Tang et al.

(10) Patent No.: US 12,598,696 B2
(45) Date of Patent: Apr. 7, 2026

(54) COMPONENT CARRIER AND METHOD OF MANUFACTURING THE SAME

(71) Applicant: AT&S (Chongqing) Company Limited, Chongqing (CN)

(72) Inventors: Lei Tang, Chongqing (CN); Yung-lin Chia, Shanghai (CN)

(73) Assignee: AT&S (Chongqing) Company Limited, Chongqing (CN)

( * ) Notice: Subject to any disclaimer, the term of this patent is extended or adjusted under 35 U.S.C. 154(b) by 216 days.

(21) Appl. No.: 18/470,797

(22) Filed: Sep. 20, 2023

(65) Prior Publication Data

US 2025/0098060 A1     Mar. 20, 2025

(30) Foreign Application Priority Data

Sep. 26, 2022    (CN) .......................... 202211175852.5

(51) Int. Cl.
| | |
|---|---|
| *H05K 1/02* | (2006.01) |
| *G06F 30/3308* | (2020.01) |
| *H05K 3/28* | (2006.01) |
| *G06F 115/12* | (2020.01) |
| *H05K 1/11* | (2006.01) |

(52) U.S. Cl.
CPC ....... *H05K 1/0271* (2013.01); *G06F 30/3308* (2020.01); *H05K 3/28* (2013.01); *G06F 2115/12* (2020.01); *H05K 1/111* (2013.01); *H05K 2201/099* (2013.01); *H05K 2203/0143* (2013.01); *H05K 2203/0577* (2013.01); *H05K 2203/058* (2013.01)

(58) Field of Classification Search
CPC . H01L 2224/48091; H01L 2224/48227; H01L 2224/48472; H01L 2224/49111; H01L 2224/49113; H01L 2924/1301; H01L 2924/13055; H01L 2924/19107; H01L 2924/00; H01L 2924/00014; G06F 2115/12; G06F 30/3308; H05K 1/0271; H05K 1/111; H05K 2201/099; H05K 2203/0143; H05K 2203/0577; H05K 2203/058; H05K 3/28; H05K 3/3452
See application file for complete search history.

(56) References Cited

U.S. PATENT DOCUMENTS

| | | | |
|---|---|---|---|
| 2007/0175657 | A1 | 8/2007 | Itoh |
| 2009/0224397 | A1 | 9/2009 | Fan |
| 2010/0132982 | A1 | 6/2010 | Cho et al. |
| 2013/0251967 | A1 | 9/2013 | Zhang et al. |

FOREIGN PATENT DOCUMENTS

| | | |
|---|---|---|
| JP | 2016046473 | 4/2016 |

OTHER PUBLICATIONS

Lien etal TW 200807661 A (Year: 2008).*

* cited by examiner

*Primary Examiner* — Lawrence D Ferguson
(74) *Attorney, Agent, or Firm* — Robert A. Blaha; Smith Tempel Blaha LLC

(57) ABSTRACT

A component carrier includes a stack with at least one electrically conductive layer structure and/or at least one electrically insulating layer structure, and a solder resist structure on at least one of two opposing main surfaces of the stack. The solder resist structure includes at least two different kinds of solder resist provided on one of said main surfaces.

20 Claims, 6 Drawing Sheets

COMPONENT CARRIER AND METHOD OF MANUFACTURING THE SAME

CROSS-REFERENCE TO RELATED APPLICATIONS

This application claims the benefit of the filing date of Chinese Patent Application No. 202211175852.5, filed Sep. 26, 2022, the disclosure of which is incorporated herein by reference in its entirety.

TECHNICAL FIELD

Embodiments of the disclosure relate to a component carrier and a method of manufacturing a component carrier.

BACKGROUND ART

In the context of growing product functionalities of component carriers equipped with one or more electronic components and increasing miniaturization of such electronic components as well as a rising number of electronic components to be mounted on the component carriers such as printed circuit boards, increasingly more powerful array-like components or packages having several electronic components are being employed, which have a plurality of contacts or connections, with ever smaller spacing between these contacts. Removal of heat generated by such electronic components and the component carrier itself during operation becomes an increasing issue. At the same time, component carriers shall be mechanically robust and electrically reliable so as to be operable even under harsh conditions.

However, undesired phenomena such as warpage and delamination of a component carrier is an issue.

SUMMARY

There may be a need to suppress undesired phenomena such as warpage and/or delamination of a component carrier.

According to an exemplary embodiment of the disclosure, a component carrier is provided, wherein the component carrier comprises a stack comprising at least one electrically conductive layer structure and/or at least one electrically insulating layer structure, and a solder resist structure on at least one of two opposing main surfaces of the stack, wherein the solder resist structure, comprising at least two different kinds of solder resist, is provided on one of said main surfaces.

According to another exemplary embodiment of the disclosure, a method is provided, the method including the steps of providing a stack comprising at least one electrically conductive layer structure and/or at least one electrically insulating layer structure, forming a solder resist structure on at least one of two opposing main surfaces of the stack, forming the solder resist structure on one of said main surfaces so as to comprise at least two different kinds of solder resist, and adjusting at least one dimension of the component carrier and/or adjusting a plurality of attributes of the solder resist structure, for controlling at least one predefined property, in particular warpage, of the component carrier.

OVERVIEW OF EMBODIMENTS

In the context of the present application, the term "component carrier" may particularly denote any support structure which is capable of accommodating one or more components thereon and/or therein for providing mechanical support and/or electrical connectivity. In other words, a component carrier may be configured as a mechanical and/or electronic carrier for components. In particular, a component carrier may be one of a printed circuit board, an organic interposer, and an IC (integrated circuit) substrate. A component carrier may also be a hybrid board combining different ones of the above-mentioned types of component carriers.

In the context of the present application, the term "stack" may particularly denote an arrangement of multiple planar layer structures which are mounted in parallel on top of one another. For example, a stack may be a laminated layer stack composed of a plurality of layer structures connected by lamination, i.e., the application of heat and/or pressure.

In the context of the present application, the term "layer structure" may particularly denote a continuous layer, a patterned layer, or a plurality of non-consecutive islands within a common plane.

In the context of the present application, the term "main surface" of a stack may particularly denote one of two largest opposing surfaces of the stack. The main surfaces may be connected by circumferential side walls. The thickness of a stack, or another body having two opposing main surfaces, may be defined by the distance between the two opposing main surfaces.

In the context of the present application, the term "solder resist structure" may particularly denote a physical structure comprising solder resist material. In particular, such a structure may be a flat layer structure covering only part of or the entire main surface the stack. Solder resist material of such a solder resist structure may protect the stack or part thereof against oxidation or corrosion, in particular may protect surface portions containing a metal such as copper. Furthermore, a solder resist may optionally define one or more surface portions of a stack of a component carrier on which no solder material shall and will attach. To put it shortly, the material of a solder resist may be selected so that solder material will not attach and remain on surface regions of a stack of a component carrier which are covered by the solder resist. A solder resist, which may also be denoted as solder mask, may be a thin lacquer-like layer, for instance of polymer, that may be applied to electrically conductive surface metal (in particular copper traces of a component carrier, such as a printed circuit board (PCB)) for protection against oxidation and to prevent solder bridges from forming between closely spaced solder pads. In this context, a solder bridge may be an unintended electrical connection between two electrically conductive structures by a spot of solder. A solder resist may prevent solder bridges. Once applied as a continuous layer on a stack, one or more openings can be created in the solder resist where material shall be electrically connected with electrically conductive layer structures of the stack, for instance for connecting them electrically with one or more surface mounted components to be soldered on the stack. Such openings may be formed by patterning the continuous layer of solder resist on the stack, for example using photolithography. For example, a solder resist may be formed based on epoxy liquid which may be silk-screened through a pattern or a mask onto the stack. It is also possible to form a solder resist on the basis of a liquid photoimageable solder mask ink which can be applied for example by spraying or silk-screening and can then be patterned. Furthermore, a solder resist may be created as a dry-film photoimageable solder mask which can be laminated and subsequently patterned on the stack.

In the context of the present application, the term "different kinds of solder resist" may particularly denote two or more solder resists having different material compositions. For example, different kinds of solder resist may be a combination of at least two of at least one epoxy liquid-based solder resist, at least one liquid photoimageable solder mask ink, and/or at least one dry-film photoimageable solder mask. Different material compositions of different kinds of solder resist may lead to different properties of each respective solder resist, for instance in terms of electric isolation, anti-adhesion properties with respect to solder, color (for example green, blue, black), corrosion protection strength, coefficient of thermal expansion (CTE), mechanical strength, etc. A solder resist structure having at least two different kinds of solder resist may be provided on one common main surface of the stack, In the context of the present application, the term "adjusting at least one dimension of the component carrier for controlling at least one predefined property, in particular warpage, of the component carrier" may particularly denote designing at least one dimension-related property of a component carrier to be manufactured for the purpose of manipulating one or more predefined properties of the readily manufactured component carrier. For example, said dimension may be a thickness of the stack or of at least one layer structure thereof, and/or a length and/or width of the stack or of at least one layer structure thereof. Adjusting at least one dimension of the component carrier may also involve forming shape-related or outline-related features, such as through holes and/or cavities in the stack. The dimension adjustment may be first made virtually, for example when theoretically modeling a component carrier, followed by a theoretical evaluation (for instance by simulation) of expected properties of the component carrier. If undesired properties are to be expected as a result of such an evaluation, the physical dimensions of the component carrier under development may be adjusted or modified in order to achieve more appropriate properties, such as compliance with a predefined specification. In particular, a predefined property may be warpage, i.e., the tendency of the component carrier to bend. Usually, such warpage is undesired, and a preferred property of the component carrier is a flat shape thereof. However, one or more other properties may be considered additionally or alternatively, for instance the tendency of delamination of individual layer structures, a thermal behavior in view of a mismatch of the coefficients of thermal extensions inside the stack, etc.

In the context of the present application, the term "adjusting a plurality of attributes of the solder resist structure for controlling at least one predefined property, in particular warpage, of the component carrier" may particularly denote that one or more material-related properties and/or one or more dimension-related properties of the solder resist structure and/or of its constituents may be assessed for designing an appropriate solder resist structure what concerns one or more properties of a corresponding component carrier. Concerning said properties (for instance a warpage, delamination tendency, thermal behavior, CTE behavior, etc.) reference is made in particular to the preceding paragraph. The adjustment of the solder resist structure may be first made virtually, for example when theoretically modeling a component carrier, followed by a theoretical evaluation (for instance by simulation) of expected properties of the component carrier. If undesired properties are to be expected as a result of such an evaluation, one or more attributes of the solder resist structure of the component carrier under development may be adjusted or modified in order to achieve more appropriate properties, such as compliance with a predefined specification.

According to an exemplary embodiment of the disclosure, a stack-type component carrier (such as a printed circuit board, PCB) is provided with a solder resist structure on one main surface. Advantageously, the latter may comprise two, three or more different kinds of solder resist providing different physical properties to the component carrier. During design and/or manufacture of the component carrier, it may be possible to adjust one or more parameters such as dimension of the component carrier and/or one or more attributes of the solder resist structure. By taking this measure, it may be possible to control one or more predefined properties of the designed and manufactured component carrier. In an advantageous embodiment, warpage of the component carrier may be controlled by adjusting component carrier dimensions and a composition of the multi solder resist structure on a main surface of the component carrier. By considering multi solder resist properties for warpage management, component carriers with highly appropriate properties may be obtained. For example, an additional solder mask may be provided and adjusted to improve the warpage properties of the (for example PCB-type) component carrier. Advantageously, the improvement of attributes of the component carrier resulting from a corresponding adjustment of the solder resist structure may be provided by the solder resist structure in addition to its primary function of protecting structures of the stack from oxidation and of separating solderable sections with respect to non-solderable sections of the component carrier. To put it shortly, the multi-type solder resist structure may synergistically fulfill a double function. It has turned out to be particularly effective in terms of warpage management to provide a plurality of different kinds of solder resist on the same main surface of the component carrier. Particularly preferred may be to provide two or more different solder mask materials and/or thicknesses for designing a (preferably stacked) solder resist structure on one common main surface of the stack.

In the following, further exemplary embodiments of the component carrier and the method will be explained.

In an embodiment, the solder resist structure is formed on both op-posing main surfaces of the stack. Hence, solder resist material may also be provided on the main surface of the stack opposing the above-mentioned main surface on which the solder resist structure comprising at least two different kinds of solder resist is provided. Preferably, said solder resist structure on said opposing main surface may comprise only one kind or type of solder resist. Alternatively, said solder resist structure on said opposing main surface may comprise at least two different kinds or types of solder resist. Consequently, properties such as warpage or delamination behavior may be adjusted in an even more refined way when both opposing main surfaces of the stack comprise a correspondingly adjusted solder resist or solder resist structure.

In an embodiment, a solder resist structure comprising at least two different kinds of solder resist is also provided on the other one of said main surfaces. Thus, both opposing main surfaces of the stack may be covered with a respective solder resist structure comprising at least two different kinds of solder resist. The solder resist structures formed on two opposing main surfaces of the stack may be the same (i.e., may be symmetric with respect to each other) or may be different (i.e., may be asymmetric with respect to each other). By providing a solder resist structure with at least two different kinds of solder resist on both opposing main surfaces, the number of design parameters for adjusting the solder resist attributes and/or component carrier properties may be further increased.

In an embodiment, the solder resist structure comprises at least two different kinds of solder resist only on said one of said main surfaces. When the opposing other main surface is free of a solder resist structure comprising at least two different kinds of solder resist, the manufacturing process may be simplified. In the described embodiment, said other main surface may either be entirely free of solder resist or may comprise only one kind of solder resist.

In an embodiment, thicknesses of the solder resist structure and/or of individual solder resists of the solder resist structure are different on the two opposing main surfaces. By adjusting the overall solder resist structure thicknesses on both opposing main surfaces to be different, a further degree of freedom may be introduced into the component carrier which may be adjusted to at least partially compensate phenomena such as warpage. Moreover, the individual thicknesses of a respective kind of solder resist or of the entire solder resist structure on one side of the stack compared to the opposing side may be used as a further design parameter for adjusting the properties of the component carrier. Solder resist thickness may have an impact on properties such as warpage, delamination, CTE distribution.

In an embodiment, thicknesses of the at least two different kinds of solder resist of the solder resist structure on one main surface of the stack are different. For instance, at least two different kinds of solder resist of a solder resist structure may be stacked in alignment with each other or in an overlapping way and may be composed of individual kinds of solder resist having different thickness values. Considering also the thickness of a solder resist stack as a degree of freedom for designing solder resist structures on one or both opposing main surfaces of the stack may allow to refine the properties of the manufactured component carriers, for instance may improve the warpage management.

In an embodiment, at least one dimension of the component carrier is adjusted for improving at least one predefined property, in particular for reducing warpage, of the component carrier. When the at least one dimension of the component carrier is adjusted, this may be carried out for enhancing or even optimizing at least one property, such as warpage of the component carrier. A correspondingly manufactured component carrier may be the result of the following development process: The component carrier is virtually designed (for instance in the form of a parameter set) and is analyzed (for instance by modeling and/or by a simulation) in terms of a predefined property such as warpage. If that analysis leads to the result that the predefined property is inappropriate, for instance fails to meet a predefined specification, a dimension of the component carrier under analysis may be modified (for instance a thickness of its stack or one or more individual layer structures thereof). If this modification indicates an improvement of the predefined property, in particular indicates that a predefined specification is now met, the component carrier can be physically manufactured based on said modified design.

Additionally or alternatively, a plurality of attributes (in particular material, thickness and/or spatial distribution) of the solder resist structure (and preferably individually for each of its different kinds of solder resist) are adjusted for improving at least one predefined property (in particular for reducing warpage) of the component carrier (in particular compared to a scenario in which solder resist is absent on the two opposing main surfaces). When the attributes of the solder resist structure are adjusted, this may be carried out for enhancing or even optimizing at least one property of the component carrier, such as warpage. A correspondingly manufactured component carrier may be the result of the following development process. The component carrier is virtually designed (for instance in the form of a parameter set) and is analyzed (for instance by modeling and/or by a simulation) in terms of a predefined property such as warpage. If that analysis leads to the result that the predefined property is inappropriate, for instance fails to meet a predefined specification, attributes of the solder resist structure of the component carrier under analysis may be modified (for instance one or more solder resist materials, one or more solder resist thicknesses and/or a combination of different types of solder resist may be modified). If this modification indicates an improvement of the predefined property, in particular indicates that a predefined specification is now met, the component carrier can be physically manufactured based on said modified design. In particular, a modified design of the at least one solder resist structure may be accepted if it indicates an improved behavior of the at least one predefined property in comparison with a complete absent solder resist or in comparison with a previous design (for instance from a previous modification iteration) of solder resist.

In an embodiment, the at least two different kinds of solder resist of the solder resist structure on one main surface are stacked on each other and on the stack. Preferably, the at least two different kinds of solder resist are stacked along the thickness direction of the component carrier. In embodiments, the at least two different kinds of solder resist are stacked on at least part of said one of said main surfaces. The stacking of the different kinds of solder resists may be so that the individual solder resists are aligned with each other along a circumferential horizontal outline thereof. It is however also possible that the different kinds of solder resist are stacked so that they overlap partially, whereas one or both of the partially stacked kinds of solder resist also include(s) a portion which is not stacked on another solder resist but is located apart from that (in particular directly on the stack).

In an embodiment, the at least two different kinds of solder resist are arranged at least partially side by side, in particular at least partially side by side on different surface portions of at least part of said one of said main surfaces. For instance, different kinds of solder resists may be arranged at the same vertical level on the stack next to each other with lateral physical contact or laterally spaced with respect to each other. Also, this approach may allow to balance out asymmetries of the component carrier, for instance caused by a CTE mismatch, by unbalanced shrinkage during curing dielectric stack material or by an asymmetry of a build-up of the stack.

In an embodiment, the at least two different kinds of solder resist overlap with each other. This may lead to a solder resist structure with sections of different height, for instance a thicker portion of two or more stacked kinds of solder resist adjacent to at least one thinner portion which may be formed by only one kind of solder resist. For example, the at least two different kinds of solder resist may overlap with each other on part of said one of said main surfaces.

In an embodiment, the at least two different kinds of solder resist are at least two different solder resist materials or material compositions. Different solder resist materials may be for example epoxy liquid-based solder resist material, liquid photoimageable-type solder resist material, dry film photoimageable-type solder resist material, and top and bottom-side masks. However, it may also be possible that the different material compositions may include the same material, which is however treated with different processing, different curing methods, different curing times, etc.

In an embodiment, the at least two different kinds of solder resist comprise ink-type solder resist and dry film-type solder resist. For instance, an ink-type solder resist may be combined with a dry film-type solder resist for forming a solder resist structure on a main surface of the stack. Hence, one or more heterogeneous solder resist structures may be formed on the stack which allows to significantly influence the properties of the component carrier, for instance what concerns warpage or delamination.

In an embodiment, the at least two different kinds of solder resist differ concerning at least one of mechanical strength, coefficient of thermal expansion, Young modulus, and color. For instance, a respective solder resist may be made of a material having a value of the coefficient of thermal expansion in a range from 30 ppm/K to 40 ppm/K. A Young modulus of the solder resist may be in a range from 1 GPa to 10 GPa, for example in a range from 2 GPa to 5 GPa. Mechanical strength may indicate the ability to withstand the stress of physical forces and may be different for the at least two different kinds of solder resist.

In an embodiment, a thickness of the solder resist structure, is in a range from 1 μm to 50 μm, in particular from 4 μm to 24 μm. By carrying out a corresponding thickness adjustment, a sensitive design parameter may be involved for adjusting properties of the manufactured component carrier, for example concerning warpage and delamination behavior.

In an embodiment, the method comprises adjusting material, thickness and/or spatial distribution of the solder resist structure, for controlling warpage of the component carrier. At least two or all three of said parameters may be used for enhancing the component carrier behavior. This may allow the manufacture of component carriers with high quality.

In an embodiment, the method comprises adjusting the at least one dimension of the component carrier and/or adjusting the plurality of attributes of the solder resist structure for controlling warpage under consideration of a spatial distribution of material of the at least one electrically conductive layer structure. For instance, metallic material (in particular copper) of electrically conductive layer structures of the stack may be distributed inhomogeneously within the stack, and in particular at the two opposing main surfaces of the stack. For example, the stack may comprise different regions of different integration density (i.e., number of electrically conductive structures per volume). For example, a higher density integration region in the stack may have a higher integration density of electrically conductive structures compared with a lower density integration region in the stack having a lower integration density of electrically conductive structures of the stack. For instance, a higher integration density region may be a region of the stack of an IC substrate-type component carrier in which at least one embedded and/or surface mounted component (such as a semiconductor chip having a high input/output (I/O) count) is electrically connected. On the other hand, another stack portion may provide less sophisticated electronic functionality, for instance a region of the IC substrate providing an electronic and mechanical coupling to a mounting base such as a PCB. A resulting inhomogeneous metal distribution of the stack may lead to undesired phenomena such as warpage, delamination and a pronounced temperature distribution during operation. By adjusting a plurality of attributes of the solder resist structure composed of two or more different kinds of solder resist on the same main surface of the stack, a large number of design parameters is available for partially or entirely compensating artifacts such as warpage and delamination caused by an inhomogeneous metal distribution within the stack.

In an embodiment, the method comprises forming at least part of the solder resist structure in a dummy region of a component carrier preform apart from the component carrier. In the context of the present application, the term "component carrier preform" may particularly denote a physical structure comprising one or a plurality of component carriers, or preforms thereof. For example, a component carrier preform may be a component carrier itself but not yet readily manufactured. Furthermore, it is also possible that a component carrier preform is a structure obtained during manufacturing component carriers, for example a panel or an array comprising a plurality of preforms of component carriers which may still be integrally connected. Such a component carrier preform (which may also be denoted as component carrier structure) may for example comprise one or more regions, such as a circumferential frame which may also include stripes extending into perpendicular directions as dummy regions. Apart from the dummy regions, component carriers (or corresponding semifinished products) may be arranged. Dummy regions may be regions of a component carrier preform being free of component carriers. By using such dummy regions for forming solder resist structures, undesired phenomena such as warpage may be at least partially compensated on panel level or on array level. Hence, it may be possible to form solder resist structures at non-functional dummy regions (which are arranged apart from functional component carriers) for refining or adjusting the properties of the component carriers manufactured on the basis of the component carrier structure or component carrier preform. Before completing manufacture of the component carriers, the dummy regions may be removed and may not be usable as component carriers.

In an embodiment, the method comprises adjusting the at least one dimension of the component carrier and/or adjusting the plurality of attributes of the solder resist structure for balancing a solder resist distribution and/or for decreasing a shrinkage force of dielectric material of the component carrier during curing. For manufacturing a stack of a component carrier such as a PCB or an IC substrate, resin-based dielectric material (such as resin sheets or prepreg sheets) may be used. For instance, such resin-based dielectric material may be interconnected within the stack by lamination, i.e., the application of pressure and/or heat. During such a curing process in terms of lamination, the mentioned resin may undergo a shrinkage process, i.e., may reduce its own volume. This may lead to undesired phenomena such as shrinkage-based stress, which may then result in increased warpage and/or a tendency of delamination. It has turned out that adjusting the plurality of attributes of the solder resist structure is a powerful tool for strongly suppressing or even eliminating shrinkage-caused artifacts. Thereby, the quality of the manufactured component carriers may be significantly improved.

In an embodiment, the method comprises virtually simulating said at least one predefined property, in particular warpage, of the component carrier, virtually modifying the at least one dimension of the component carrier and/or the plurality of attributes of the solder resist structure for improving said at least one predefined property, in particular for reducing simulated warpage, and thereafter physically forming the component carrier with the modified at least one dimension and/or physically forming the solder resist structure of the component carrier with the modified attributes. The processes of virtually simulating and virtually modifying may be executed by simulation and/or computer assistance. More specifically, a process of manufacturing component carriers may start with a virtual design of the component carrier, i.e., by defining its properties. After that, the virtually designed component carrier may undergo evaluation, for instance by a numerical analysis, a simulation, modeling and/or an analysis involving expert knowledge. For example, the mentioned evaluation may comprise a calculation of expected warpage. Said evaluation may specifically address potential issues concerning one or more expected properties of the component carriers, for example warpage. During this process, it may be possible to predict the warpage (for instance based on a mathematical approach, modelling of the component carriers to be manufactured, etc.). A set of design parameters characterizing the solder resist structure(s) may then be virtually modified, and the above-described evaluation may be repeated with the changed design parameters. If the repeated application indicates that the changed design parameters improve the at least one property under analysis, the changes may be accepted, otherwise they may be rejected. Optionally, the mentioned process may be repeated iteratively once or a plurality of times for successively improving or even optimizing the virtual component carrier with regard to said at least one property. To put it shortly, the solder mask configuration may be adjusted to reduce warpage. For instance, when compliance with a predefined specification of the component carrier is achieved with one or more changed design parameters, the manufacturing process of physically manufacturing component carriers may be executed using said set of design parameters. This manufacturing process may in particular include formation of the solder resist structure(s) in accordance with an approved set of design parameters thereof.

In an embodiment, at least one component (such as an electronic component, for example a semiconductor die) may be surface mounted on the stack and/or may be embedded in the stack.

In an embodiment, the component carrier is shaped as a plate. This contributes to the compact design, wherein the component carrier nevertheless provides a large basis for mounting components thereon. Furthermore, in particular a naked die as example for an embedded electronic component, can be conveniently embedded, thanks to its small thickness, into a thin plate such as a printed circuit board.

In an embodiment, the component carrier is configured as one of the group consisting of a printed circuit board, a substrate (in particular an IC substrate), and an interposer.

In the context of the present application, the term "printed circuit board" (PCB) may particularly denote a plate-shaped component carrier which is formed by laminating several electrically conductive layer structures with several electrically insulating layer structures, for instance by applying pressure and/or by the supply of thermal energy. As preferred materials for PCB technology, the electrically conductive layer structures are made of copper, whereas the electrically insulating layer structures may comprise resin and/or glass fibers, so-called prepreg or FR4 material. The various electrically conductive layer structures may be connected to one another in a desired way by forming holes through the laminate, for instance by laser drilling or mechanical drilling, and by partially or fully filling them with electrically conductive material (in particular copper), thereby forming vias or any other through-hole connections.

The filled hole either connects the whole stack, (through-hole connections extending through several layers or the entire stack), or the filled hole connects at least two electrically conductive layers, called via. Similarly, optical interconnections can be formed through individual layers of the stack in order to receive an electro-optical circuit board (EOCB). Apart from one or more components which may be embedded in a printed circuit board, a printed circuit board is usually configured for accommodating one or more components on one or both opposing surfaces of the plate-shaped printed circuit board. They may be connected to the respective main surface by soldering. A dielectric part of a PCB may be composed of resin with reinforcing fibers (such as glass fibers).

In the context of the present application, the term "substrate" may particularly denote a small component carrier. A substrate may be a, in relation to a PCB, comparably small component carrier onto which one or more components may be mounted and that may act as a connection medium between one or more chip(s) and a further PCB. For instance, a substrate may have substantially the same size as a component (in particular an electronic component) to be mounted thereon (for instance in case of a Chip Scale Package (CSP)). More specifically, a substrate can be understood as a carrier for electrical connections or electrical networks as well as component carrier comparable to a printed circuit board (PCB), however with a considerably higher density of laterally and/or vertically arranged connections. Lateral connections are for example conductive paths, whereas vertical connections may be for example drill holes. These lateral and/or vertical connections are arranged within the substrate and can be used to provide electrical, thermal and/or mechanical connections of housed components or unhoused components (such as bare dies), particularly of IC chips, with a printed circuit board or intermediate printed circuit board. Thus, the term "substrate" also includes "IC substrates". A dielectric part of a substrate may be composed of resin with reinforcing particles (such as reinforcing spheres, in particular glass spheres).

The substrate or interposer may comprise or consist of at least a layer of glass, silicon (Si) and/or a photoimageable or dry-etchable organic material like epoxy-based build-up material (such as epoxy-based build-up film) or polymer compounds (which may or may not include photo- and/or thermosensitive molecules) like polyimide or polybenzoxazole.

In an embodiment, the at least one electrically insulating layer structure comprises at least one of the group consisting of a resin or a polymer, such as epoxy resin, cyanate ester resin, benzocyclobutene resin, bismaleimide-triazine resin, polyphenylene derivate (e.g. based on polyphenylenether, PPE), polyimide (PI), polyamide (PA), liquid crystal polymer (LCP), polytetrafluoroethylene (PTFE) and/or a combination thereof. Reinforcing structures such as webs, fibers, spheres or other kinds of filler particles, for example made of glass (multilayer glass) in order to form a composite, could be used as well. A semi-cured resin in combination with a reinforcing agent, e.g., fibers impregnated with the above-mentioned resins is called prepreg. These prepregs are often named after their properties, e.g., FR4 or FR5, which describe their flame-retardant properties. Although prepreg particularly FR4 are usually preferred for rigid PCBs, other materials, in particular epoxy-based build-up materials (such as build-up films) or photoimageable dielectric materials, may be used as well. For high frequency applications, high-frequency materials such as polytetrafluoroethylene, liquid crystal polymer and/or cyanate ester resins, may be preferred. Besides these polymers, low temperature cofired ceramics (LTCC) or other low, very low or ultra-low DK materials may be applied in the component carrier as electrically insulating structures.

In an embodiment, the at least one electrically conductive layer structure comprises at least one of the group consisting of copper, aluminum, nickel, silver, gold, palladium, tungsten and magnesium. Although copper is usually preferred, other materials or coated versions thereof are possible as well, in particular coated with supra-conductive material or conductive polymers, such as graphene or poly(3,4-ethylenedioxythiophene) (PEDOT), respectively.

At least one component, which can be surface mounted on the stack and/or embedded in the stack, can be selected from a group consisting of an electrically non-conductive inlay, an electrically conductive inlay (such as a metal inlay, preferably comprising copper or aluminum), a heat transfer unit (for example a heat pipe), a light guiding element (for example an optical waveguide or a light conductor connection), an electronic component, or combinations thereof. An inlay can be for instance a metal block, with or without an insulating material coating (IMS-inlay), which could be either embedded or surface mounted for the purpose of facilitating heat dissipation. Suitable materials are defined according to their thermal conductivity, which should be at least 2 W/mK. Such materials are often based, but not limited to metals, metal-oxides and/or ceramics as for instance copper, aluminum oxide ($Al_2O_3$) or aluminum nitride (AlN). In order to increase the heat exchange capacity, other geometries with increased surface area are frequently used as well. Furthermore, a component can be an active electronic component (having at least one p-n-junction implemented), a passive electronic component such as a resistor, an inductance, or capacitor, an electronic chip, a storage device (for instance a DRAM or another data memory), a filter, an integrated circuit (such as field-programmable gate array (FPGA), programmable array logic (PAL), generic array logic (GAL) and complex programmable logic devices (CPLDs)), a signal processing component, a power management component (such as a field-effect transistor (FET), metal-oxide-semiconductor field-effect transistor (MOSFET), complementary metal-oxide-semiconductor (CMOS), junction field-effect transistor (JFET), or insulated-gate field-effect transistor (IGFET), all based on semi-conductor materials such as silicon carbide (SiC), gallium arsenide (GaAs), gallium nitride (GaN), gallium oxide ($Ga_2O_3$), indium gallium arsenide (InGaAs), indium phosphide (InP), and/or any other suitable inorganic compound), an optoelectronic interface element, a light emitting diode, a photocoupler, a voltage converter (for example a DC/DC converter or an AC/DC converter), a cryptographic component, a transmitter and/or receiver, an electromechanical transducer, a sensor, an actuator, a microelectromechanical system (MEMS), a microprocessor, a capacitor, a resistor, an inductance, a battery, a switch, a camera, an antenna, a logic chip, and an energy harvesting unit. However, other components may be embedded in the component carrier. For example, a magnetic element can be used as a component. Such a magnetic element may be a permanent magnetic element (such as a ferromagnetic element, an antiferromagnetic element, a multiferroic element or a ferrimagnetic element, for instance a ferrite core) or may be a paramagnetic element. However, the component may also be an IC substrate, an interposer or a further component carrier, for example in a board-in-board configuration. The component may be surface mounted on the component carrier and/or may be embedded in an interior thereof.

Moreover other components, in particular those which generate and emit electromagnetic radiation and/or are sensitive with regard to electromagnetic radiation propagating from an environment, may be used as component.

In an embodiment, the component carrier is a laminate-type component carrier. In such an embodiment, the component carrier is a compound of multiple layer structures which are stacked and connected together by applying a pressing force and/or heat.

After processing interior layer structures of the component carrier, it is possible to cover (in particular by lamination) one or both opposing main surfaces of the processed layer structures symmetrically or asymmetrically with one or more further electrically insulating layer structures and/or electrically conductive layer structures. In other words, a build-up may be continued until a desired number of layers is obtained.

After having completed formation of a stack of electrically insulating layer structures and electrically conductive layer structures, it is possible to proceed with a surface treatment of the obtained layers structures or component carrier.

In particular, an electrically insulating solder resist may be applied to one or both opposing main surfaces of the layer stack or component carrier in terms of surface treatment. For instance, it is possible to form such a solder resist on an entire main surface and to subsequently pattern the layer of solder resist so as to expose one or more electrically conductive surface portions which shall be used for electrically coupling the component carrier to an electronic periphery. The surface portions of the component carrier remaining covered with solder resist may be efficiently protected against oxidation or corrosion, in particular surface portions containing copper.

It is also possible to apply a surface finish selectively to exposed electrically conductive surface portions of the component carrier in terms of surface treatment. Such a surface finish may be an electrically conductive cover material on exposed electrically conductive layer structures (such as pads, conductive tracks, etc., in particular comprising or consisting of copper) on a surface of a component carrier. If such exposed electrically conductive layer structures are left unprotected, then the exposed electrically conductive component carrier material (in particular copper) might oxidize, making the component carrier less reliable. A surface finish may then be formed for instance as an interface between a surface mounted component and the component carrier. The surface finish has the function to protect the exposed electrically conductive layer structures (in particular copper circuitry) and enable a joining process with one or more components, for instance by soldering. Examples for appropriate materials for a surface finish are Organic Solderability Preservative (OSP), Electroless Nickel Immersion Gold (ENIG), Electroless Nickel Immersion Palladium Immersion Gold (ENIPIG), gold (in particular hard gold), chemical tin, nickel-gold, nickel-palladium, etc.

The aspects defined herein and further aspects of the disclosure are apparent from the examples of embodiment to be described hereinafter and are explained with reference to these examples of embodiment.

BRIEF DESCRIPTION OF THE DRAWINGS

FIG. 11 illustrates another apparatus for manufacturing a component carrier with a plurality of different solder resists according to an exemplary embodiment of the disclosure.

FIG. 12, FIG. 13, FIG. 14, and FIG. 15 illustrate cross-sectional views of component carriers with a plurality of different solder resists according to exemplary embodiments of the disclosure.

FIG. 16 illustrates a plan view and a cross-sectional view of a component carrier structure with component carriers and with a solder resist structure comprising a plurality of different solder resists in a dummy region of the component carrier structure according to an exemplary embodiment of the disclosure.

FIG. 17 illustrates a cross-sectional view of a solder resist structure with engaging solder resists of a component carrier according to an exemplary embodiment of the disclosure.

DETAILED DESCRIPTION OF ILLUSTRATED EMBODIMENTS

Figures 1, 2, 3:
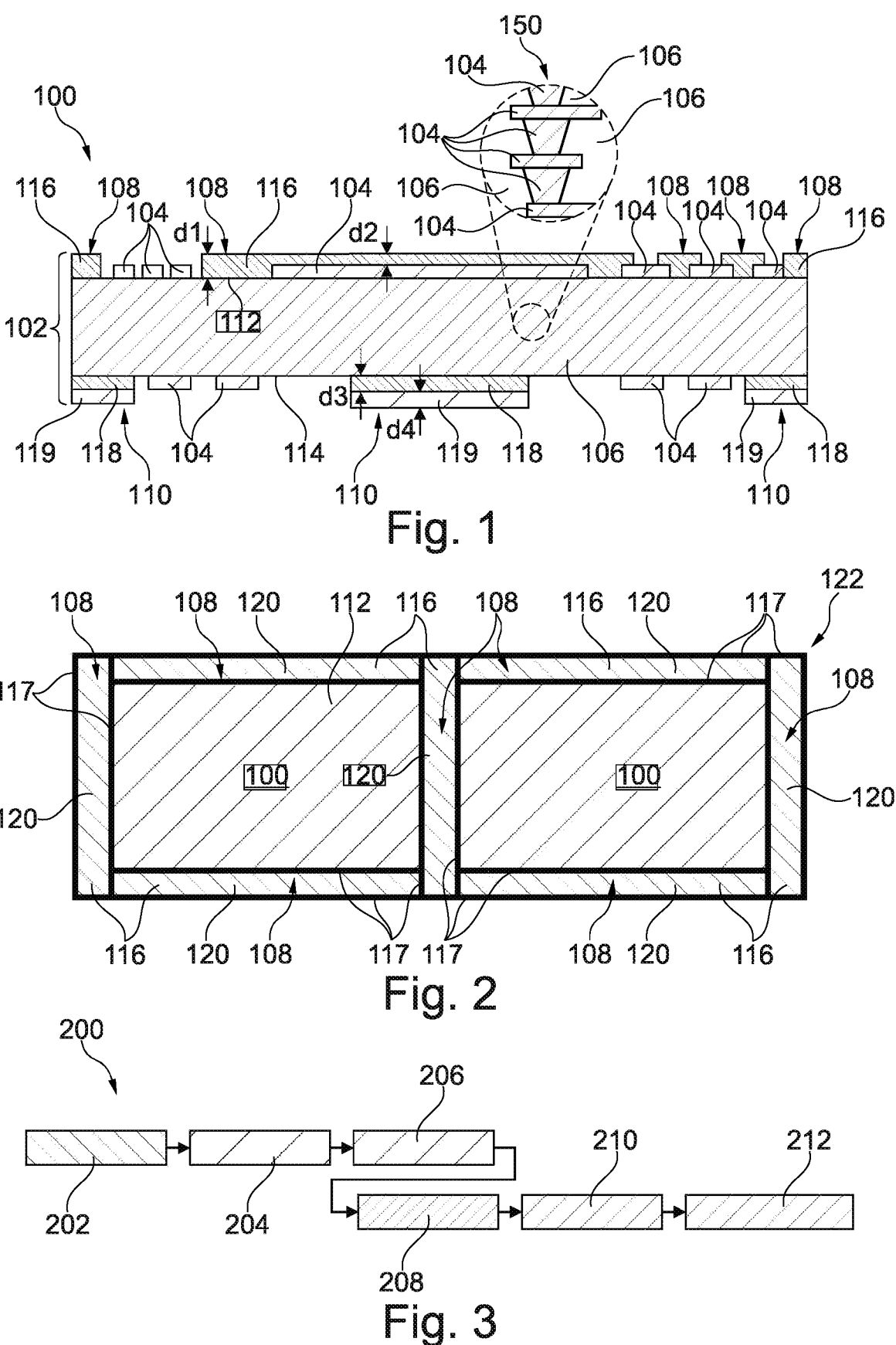
FIG. 1 illustrates a cross-sectional view of a component carrier with a plurality of different solder resists according to an exemplary embodiment of the disclosure.
FIG. 2 illustrates a plan view of component carriers with a plurality of different solder resists according to an exemplary embodiment of the disclosure.
FIG. 3 illustrates a flowchart of a method of manufacturing a component carrier with a plurality of different solder resists according to an exemplary embodiment of the disclosure.

The illustrations in the drawings are schematically presented. In different drawings, similar or identical elements are provided with the same reference signs.

Before referring to the drawings, exemplary embodiments will be described in further detail, some basic considerations will be summarized based on which exemplary embodiments of the disclosure have been developed.

According to an exemplary embodiment of the disclosure, a component carrier (for instance a printed circuit board) with a (preferably laminated) layer stack is provided which has a solder resist structure on one or both of two opposing main surfaces of the stack. Advantageously, a solder resist structure on at least one main surface is composed of two or more different kinds of solder resist (such as different solder resist materials). By adjusting attributes (such as material selection, thickness selection, shape selection, positioning selection, appropriate pairing of different solder resists, etc.) of the solder resist structure, one or more specific properties (such as warpage of the stack, delamination of individual layer structures, curing shrinkage of dielectric stack material) of the component carrier may be adjusted in a desired way.

In particular, a design process according to an exemplary embodiment of the disclosure may allow to create an improved or even optimized structure of a component carrier what concerns warpage. For instance, it may be possible to adjust or even optimize a thickness and/or a material of a solder mask and to combine different solder mask patterns to improve the at least one property, such as warpage behavior. Such an approach may render it possible to decrease warpage in a stand still status.

Advantageously, it may be possible to balance the solder mask distribution between an array area and a card area. In this context, an array may be a part (for instance a quarter panel) of a panel used for manufacturing a large plurality of component carriers (also denoted as cards). Apart from the card areas corresponding to the component carriers to be manufactured, regions (which may also be denoted as dummy regions) of an array or a panel between or apart from cards may be used for forming dummy solder resist structures (for instance comprising at least two different kinds of solder resists) thereon. Thus, solder resist structures may also be formed in the regions in which they do not function as solder resist, but to do this for adjusting properties (such as warpage) of component carriers. Hence, applying specifically designed heterogeneous solder resist structures in functional component carrier regions and/or in non-functional dummy regions between component carriers may allow to design component carriers with desired properties.

For instance, it may also be possible to decrease a shrinkage force in a solder mask process flow. By taking this measure, it may be possible to decrease solder mask reflow missing and/or package fail rate. Consequently, a high yield may be obtained while the described manufacturing architecture also allows to manufacture component carriers with high throughput on an industrial scale. In particular, an asymmetric design of solder resist structures may at least partially compensate for asymmetries in a stack design.

Exemplary applications of exemplary embodiments of the disclosure are modules, watches, automotive component carriers and component carriers for mobile devices. Also, for high frequency applications, exemplary embodiments may be advantageously implemented.

An exemplary embodiment of the disclosure involves an asymmetric solder mask design. In particular, it may be possible to control two times solder mask thickness, and each time a selectable solder mask material to at least partially balance the shrinkage from design or material CTE differences. By providing an additional pattern design on a dummy area of a component carrier structure, it may be possible to add a further support in a reflow period to prevent or suppress occurring warpage.

For instance, it may be possible to process two opposing sides of a stack using different solder mask thickness to control the warpage. For instance, this may make it possible to improve the warpage to increase the yield. Apart from this, it may be possible to decrease a de-warpage rework rate which may additionally enhance production efficiency. Beyond this, it may be possible to decrease the risk of panel jam by better warpage performance. Exemplary embodiments may reliably avoid bending and may strengthen the structure to overcome original limitations. Advantageously, it may be possible to add one layer or increase one layer thickness of a solder resist structure to balance the shrinkage or expansion in a thermal process, such as lamination. For instance, it may be possible to provide an additional pattern in an array frame or another non-functional region of a panel to increase support strength. In particular, a solder resist structure with two or more layers of solder mask may be provided, wherein the different layers may have different thicknesses and/or properties selected to reduce CTE mismatch. This may balance shrinkage partially or entirely.

According to an exemplary embodiment, at least one main surface of a stack of a component carrier may be covered with a solder resist structure. Different kinds of solder resist or solder masks with different CTEs may be combined in a solder resist. Such an approach may make it possible to tune the CTE value rather than to tune a thickness to avoid warpage. Exemplary embodiments of the disclosure may allow to control the warpage of a component carrier (such as a substrate) utilizing solder masks having different thicknesses and/or different material characteristics. Different thicknesses of solder masks may be disposed on the top surface and/or on the bottom surface of a stack of the component carrier, and/or on the same surface of the stack, thus suppressing warping and deformation of the component carrier.

By using a single or additional layer of a solder resist structure, it may be possible to balance differences between top and bottom layers. This may allow to enhance a dynamic warpage weakness location. Warpage may be decreased and the yield may be improved.

FIG. 1 illustrates a cross-sectional view of a component carrier 100 with a plurality of different solder resists 116, 118, 119 according to an exemplary embodiment of the disclosure.

The illustrated component carrier 100 may be a plate-shaped laminate-type component carrier, such as a printed circuit board (PCB). FIG. 1 shows a laminated stack 102 which is composed of electrically conductive layer structures 104 and one or more electrically insulating layer structures 106, see also detail 150. For example, the electrically conductive layer structures 104 may comprise patterned copper foils. Furthermore, stack 102 may also comprise one or more electrically conductive layer structures 104 configured as vertical through-connections, for example copper filled laser vias. The electrically insulating layer structures 106 may comprise a resin (such as epoxy resin), optionally comprising reinforcing particles therein (for instance glass fibers or glass spheres). For instance, the electrically insulating layer structures 106 may be made of FR4. In particular, any of the electrically insulating layer structures 106 may be a core. Several of the layer structures 104, 106 may be connected by lamination, i.e., the application of pressure and/or heat.

Furthermore, component carrier 100 comprises a first solder resist structure 108 on an upper main surface 112 of the stack 102. Apart from this, component carrier 100 comprises a second solder resist structure 110 on a lower main surface 114 of the stack 102. Surface regions of the stack 102 covered by the first solder resist structure 108 are not in full alignment with surface regions of the stack 102 covered by the second solder resist structure 110. An exposed area may be defined by ink.

The first solder resist structure 108 is formed by a solder resist 116 formed directly on part of the upper main surface 112. Hence, the solder resist 116 is a patterned layer of solder resist material. Some portions of the electrically conductive layer structure 104 at the upper main surface 112 of stack 102 are covered by the solder resist 116, whereas other portions of the electrically conductive layer structure 104 at the upper main surface 112 are exposed beyond the solder resist 116. The solder resist 116 has a region with a first thickness d1 and has another region with a smaller second thickness d2, where the solder resist 116 covers the electrically conductive layer structure 104.

The second solder resist structure 110 comprises a solder resist 118 formed directly on part of the lower main surface 114 and a solder resist 119 formed on the solder resist 118. Hence, the solder resists 118, 119 form a patterned layer stack of two different solder resist materials. In other words, two different kinds of solder resist 118, 119 are stacked on each other on the lower main surface 114. As shown, the patterned layers forming solder resists 118, 119 are stacked on top of each other and are aligned with each other, for instance as a consequence of a common patterning process for patterning solder resists 118, 119 together. In the shown embodiment, the electrically conductive layer structure 104 at the lower main surface 114 is exposed beyond the solder resists 118, 119. The solder resist 118 has a constant thickness d3, and the solder resist 119 has a separately adjustable constant thickness d4.

Thus, the first solder resist structure 108 is formed of a single kind of solder resist 116, whereas the second solder resist structure 110 comprises two different kinds of solder resist 118, 119. Thicknesses d1 or d2 and d3+d4 of the solder resist structures 108, 110 of the solder resist structures 108, 110 may be different on the two opposing main surfaces 112, 114, or may be the same. Even thicknesses d3, d4 of the two different kinds of solder resists 118, 119 may be different or the same. For instance, the individual thicknesses d1, d2, d3, d4 of the solder resists 116, 118, 119 may be adjusted individually and may be preferably each in a range from 4 $\mu$m to 24 $\mu$m. This may ensure that the patterned solder resists 116, 118, 119 reliably provide a continuous layer section where formed. At the same time, this may ensure that the patterned solder resists 116, 118, 119 do not involve an excessive inhomogeneity.

The different kinds of solder resist 116, 118, 119 may be different solder resist materials or different material compositions of the same solder resist materials. However, some of the solder resists 116, 118, 119 may also be the same solder resist materials or material compositions. Any of the solder resists 116, 118, 119 may be ink-type solder resist or dry film-type solder resist. For example, solder resist 116 may be an ink-type solder resist which may be applied in liquid form, whereas solder resists 118, 119 may be dry film-type solder resists which may be laminated on or above stack 102. In view of their potentially different materials and/or thicknesses, the individual solder resists 116, 118, 119 may differ concerning parameters such as mechanical strength (i.e., may have a different mechanical robustness), coefficient of thermal expansion (i.e., may expand or contract in a different way by temperature changes), Young modulus (i.e., may be softer or harder), and/or color (for example green or black).

For example, solder resists 116 and 118 may be applied for providing a traditional solder resist function, i.e., protection against oxidation or corrosion and avoidance of unintentional solder bridges. In such a scenario, the additional solder resist 119 may be freely designed so as to provide an additional function, in particular a warpage suppression function. Material and type, thickness d4, and spatial distribution of the patterned solder resist 119 are design parameters which may be selected appropriately so as to balance out any inhomogeneity of stack 102 with solder resists 116 and 118 which may be a source of warpage. In particular forming a double layer of solder resists 118 and 119 on the same main surface 114 is advantageous in this context, since it combines a simple manufacturing process (for instance in terms of applying and patterning the solder resists 118, 119) with a high-efficiency in terms of influencing component carrier 100 concerning warpage (in view of the large number of freely selectable design parameters, as mentioned above).

When designing component carrier 100, also one or more dimensions (such as height, length, and width) of the component carrier 100 and its constituents (in particular of layer structures 104, 106) may be adjusted for obtaining target properties, for instance concerning warpage, of the component carrier 100. Additionally or alternatively, attributes such as solder mask material, thickness d1, d2, d3, d4 and/or spatial distribution of the solder resists 116, 118, 119 on the respective main surface 112, 114 may be adjusted for obtaining target properties, for instance concerning warpage, of the component carrier 100. For instance, the solder resist structures 108, 110 may be specifically designed for reducing warpage compared to a scenario in which solder resist is absent on the two opposing main surfaces 112, 114.

A process for designing and finally manufacturing the component carrier 100 may comprise a virtual (for example computer-assisted) simulation of the behavior of one or more predefined properties of interest, such as warpage, of the component carrier 100 to be designed. During such a simulation, it may be possible to modify one or more parameterized dimensions of the component carrier 100 and/or the material-related and geometrical attributes of the solder resist structures 108, 110 and its individual solder resists 116, 118, 119. A simulation or evaluation of an initial component carrier design and a modified component carrier design may be executed for example by a numerical analysis, a simulation, a theoretical model and/or an analysis based on empirical data (for instance taken from historic component carrier development processes). If the modified parameterization of the component carrier 100 and in particular of its solder resist structures 108, 110 indicates in the simulation that a target specification (for instance concerning warpage) is fulfilled, the component carrier 100 may be manufactured on the basis of a corresponding parameter set, otherwise the modification and evaluation process may be continued. During the processes of parameterizing and simulating a component carrier to be developed, it may be possible to predict the warpage. Design parameters characterizing the component carrier to be manufactured and in particular the solder resist structures may be modified or fitted until obtained component carrier dimensions and a solder mask configuration indicate compliance with a target specification. Thereafter, a component carrier manufacturing process may be carried out accordingly in the real world.

During the described process, modifiable parameters of the solder re-sist structures 108, 110 are in particular number of solder resists per solder resist structure 108, 110 and per main surface 112, 114, materials of the solder resists 116, 118, 119, thicknesses d1, d2, d3, d4 of the solder resists 116, 118, 119, patterning properties of the solder resist structures 108, 110, etc.

Advantageously, the solder resists 116, 118, 119 function for protecting the stack 102 (and in particular its exposed electrically conductive layer structures 104) against oxidation or corrosion while simultaneously preventing solder bridges from forming between closely spaced solder pads. Advantageously, exemplary embodiments of the disclosure synergistically use the above-mentioned and/or other attributes of the solder resists 116, 118, 119 (in particular of multi-layer solder resist structure 110 and more specifically of solder resist 119 thereof) for adjusting one or more properties of the obtained component carrier 100, in particular for warpage management and suppression of delamination.

In particular, the provision of an additional solder resist layer of the stacked solder resist structure 110 and/or different solder resist thicknesses on both sides of stack 102 may contribute to a high optimization potential when designing component carrier 100 in terms of warpage management. In particular, different solder mask material and/or thickness on different sides of a component carrier may be used as adjustable design parameters to balance curing shrinkage of dielectric stack material. Furthermore, solder resist volumes on both sides of stack 102 may be used to balance warpage. In particular, flexibly designable solder mask layers and solder mask material for shrinkage management may be used. In particular the additional solder resist 119 of the double-layer solder resist structure 110 may be freely used for adjusting or even optimizing properties of the component carrier 100.

The shown embodiment allows a significant warpage failure rate improvement before de-warping.

Hence, an additional solder resist layer 119 may be provided at least on one side of the stack 102. Furthermore, it may be possible to use different solder resist materials on different sides of the stack 102. Preferably, more than one solder resist material and more than one solder resist thickness may be implemented.

Adjustment of dimensions of the component carrier 100 and adjustment of attributes of the solder resist structures 108, 110 may be carried out for controlling warpage under consideration of a spatial distribution of metallic material (in particular copper) of the electrically conductive layer structure(s) 104 on stack 102. Descriptively speaking, the warpage-suppressing function of the solder resist structure 110 and in particular its additional solder resist 119 results from an at least partial compensation of the inhomogeneous copper distribution on the main surfaces 112, 114. FIG. 1 shows that the amount of copper on main surface 112 is larger than on main surface 114. This may be a source of warpage. By providing additional solder resist material in form of solder resist 119, the material distribution between main surfaces 112, 114 may be rendered more homogeneous or symmetric, which may suppress warpage. For example, the thickness d4, the solder resist material and the location and spatial distribution of solder resist 119 may be used as adjustable design parameters for suppressing warpage caused by the inhomogeneous copper distribution.

FIG. 2 illustrates a plan view of component carriers 100 with a plurality of different solder resists 116, 117 according to an exemplary embodiment of the disclosure.

According to FIG. 2, a solder resist structure 108 is formed (at least partially) in a dummy region 120 of a component carriers 100. The component carrier preform 122 can for instance be an array of a panel on which a plurality of component carriers 100 are manufactured in a batch process. The illustrated component carriers 100 form functional areas of the component carrier preform 122. A frame around the component carriers 100, forming dummy region 120, is a non-functional area of the component carrier preform 122 in which no component carriers 100 are manufactured. Said frame-type dummy region 120 is used according to FIG. 2 for forming a solder resist structure 108 adjusted specifically for balancing shrinkage.

FIG. 3 illustrates a flowchart 200 of a method of manufacturing a component carrier 100 with a plurality of different solder resists 116, 117, 118, 119 according to an exemplary embodiment of the disclosure.

As shown in a block 202, an out-layer pattern is formed. For instance, copper pads are formed on main surfaces 112, 114 of a stack 102.

As shown in a block 204, a first solder mask is formed as solder resist structure 110, for instance on the lower main surface 114. This may involve forming an ink-type solder resist 118 and a dry-film-type solder resist 119 thereon. Each solder resist 118, 119 may be formed with flexible thickness.

As shown in a block 206, a second solder mask is formed as solder resist structure 108, for instance on the upper main surface 112. The solder resist structure 108 may be formed as solder resist 116.

Materials, thicknesses, shape, and position of solder resists 116, 118, 119 may be adjusted individually and separately, for instance for warpage management. The adjustment of the attributes of the solder resist structures 108, 110 may be executed for balancing a solder resist distribution and for decreasing a shrinkage force of dielectric material of the component carrier 100 during curing.

As shown in a block 208, a surface metallization of exposed surface portions of electrically conductive layer structures 104 may be formed, for example selectively on exposed copper but not on the solder resist structures 108, 110. For instance, exposed copper may be subjected to Electro-less Nickel Immersion Gold (ENIG), Organic Solderability Preservative (OSP), Electroless Nickel Immersion Palladium Immersion Gold (ENIPIG), gold (in particular hard gold), chemical tin, nickel-gold, nickel-palladium, etc.

As shown in a block 210, the component carriers 100 may be subject-ed to routing. For example, the individual component carriers 100 may be separated from a component carrier preform 122 with dummy region 120, such as a panel.

As shown in a block 212, the component carriers 100 may be subjected to a warpage measurement. If the measured warpage is within a specification, manufacture of the component carrier 100 may be completed. If the measured warpage is outside of a specification, manufacture of the component carrier 100 may be continued, for instance by modifying the formed solder resist structures 108, 110 or by adding additional solder resist for at least partially compensating the measured warpage.

Figures 4, 5, 6:
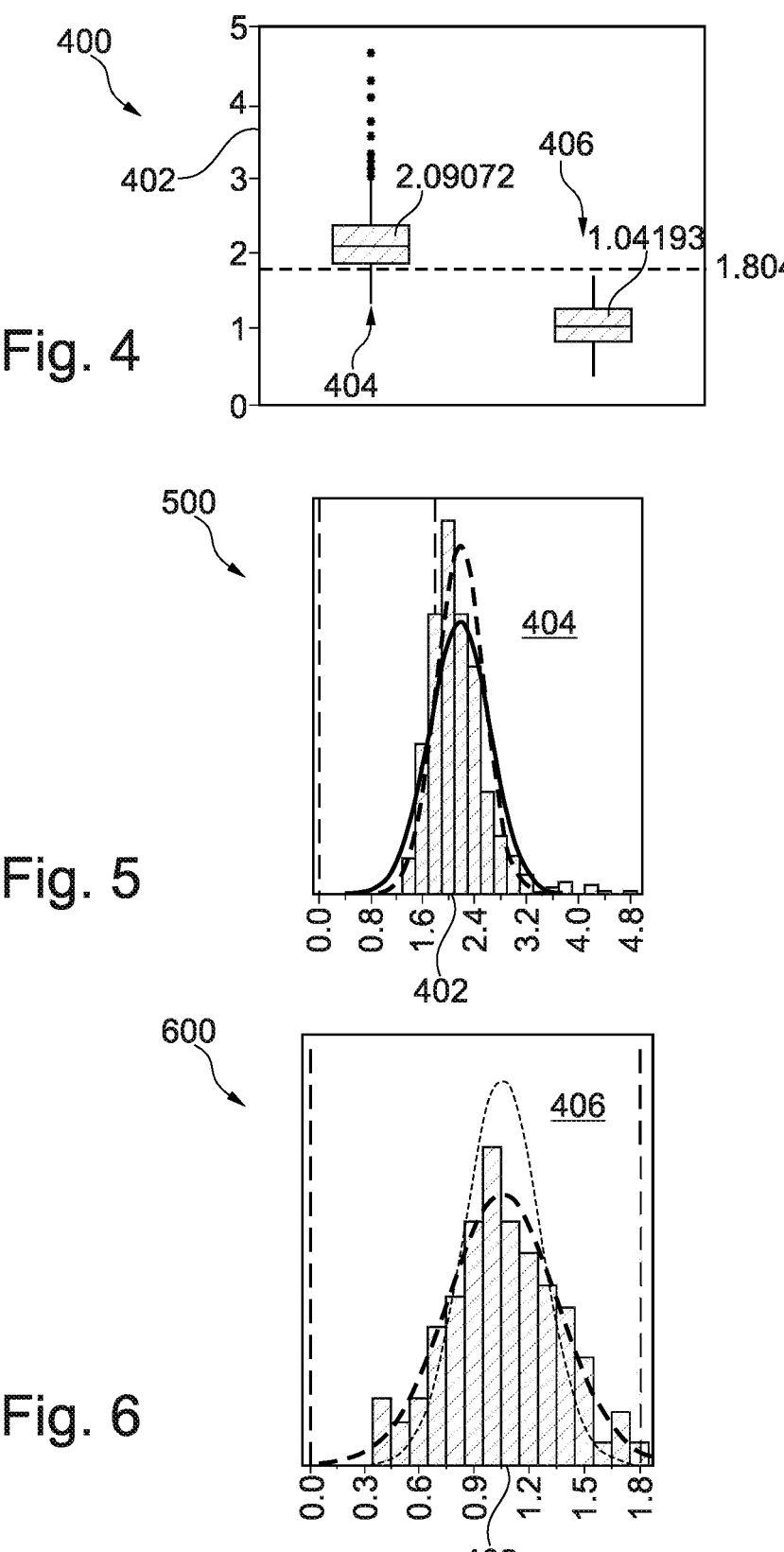
FIG. 4, FIG. 5, and FIG. 6 illustrate diagrams indicating effects of providing a plurality of different solder resists on a component carrier according to an exemplary embodiment of the disclosure.

FIG. 4 to FIG. 6 illustrate diagrams 400, 500, 600 indicating effects of providing a plurality of different solder resists 116, 117, 118, 119 on a component carrier 100 according to an exemplary embodiment of the disclosure.

Referring to FIG. 4, a diagram 400 is shown plotting warpage 402 before (see reference sign 404) and after (see reference sign 406) adjustment of solder resist structures 108, 110. A dotted line indicates a limit (1.804 in the present example) of a specification concerning warpage which shall not be exceeded. According to reference sign 404, the warpage limit is exceeded (2.09072 in the present example). According to reference sign 406, the warpage limit is not exceeded (1.04193 in the present example). FIG. 5 shows a diagram 500 showing results of the warpage measurement before the adjustment. A warpage fitting curve is above the warpage limit. FIG. 6 shows a diagram 600 showing results of the warpage measurement after the adjustment. A warpage fitting curve is now below the warpage limit.

Each of FIG. 5 and FIG. 6 shows an abscissa illustrating a warpage value (in millimeters), whereas a respective ordinate indicates a corresponding product quantity (in pieces). In FIG. 6, the amount of warpage (indicated by the warpage limit) is significantly reduced compared with FIG. 5. As can be taken from FIG. 4 to FIG. 6, warpage can be significantly reduced from more than 2 mm to about 1 mm by carrying out two times roller coating with asymmetric solder resist design. While warpage is high and out of specification before said adjustment, warpage is significantly lower and within the specification after the adjustment.

Figures 7, 8, 9:
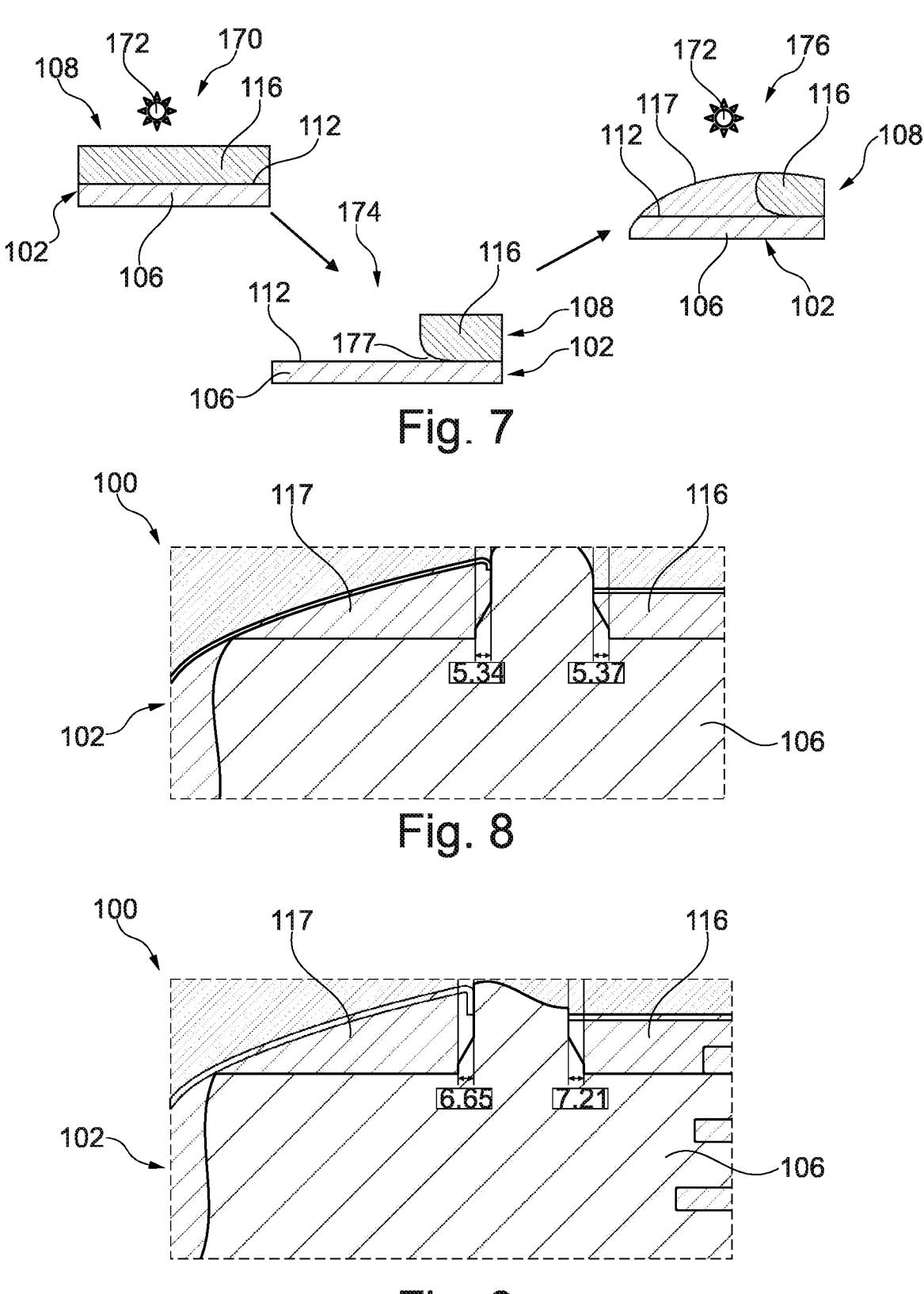
FIG. 7 illustrates different structures obtained during carrying out a method of manufacturing a component carrier according to an exemplary embodiment of the disclosure.
FIG. 8 and FIG. 9 illustrate cross-sectional views of component carriers with a plurality of different solder resists according to exemplary embodiments of the disclosure.

FIG. 7 illustrates different structures obtained during carrying out a method of manufacturing a component carrier 100 according to an exemplary embodiment of the disclosure.

As shown with reference sign 170, a dry film-type solder resist 116 is formed on a prepreg layer (see electrically insulating layer structure 106) of stack 102 and is subjected to exposure (see reference sign 172). Reference sign 174 shows the resulting structure after development. As can be taken from reference sign 174, the top side of solder resist 116 exhibits stronger curing than the bottom side thereof exhibiting weaker curing.

Descriptively speaking, the exposed surface on top of the solder resist 116 may be more cured compared to the portion of said solder resist 116 which has at least one common surface area portion with the electrically insulating layer structure 106 on the bottom side. By the manufacturing process forming the solder resist 116, an undercut portion 177 may be created, as illustrated in FIG. 7. Said undercut portion 177 may be in compliance with an undercut specification (for example may be smaller than 15 μm).

As shown with reference sign 176, an ink-type solder resist 117 is then applied and subjected to exposure. The top side of solder resist 117 exhibits stronger curing that the bottom side thereof exhibiting weaker curing. Solder resist 117 may fill up the undercut portion 177 partially or completely, which may ensure a higher reliability of adhesion of the solder resists 116, 117.

FIG. 8 and FIG. 9 illustrate cross-sectional views of component carriers 100 with different solder resists 116, 117, as explained referring to FIG. 7.

Figure 10:
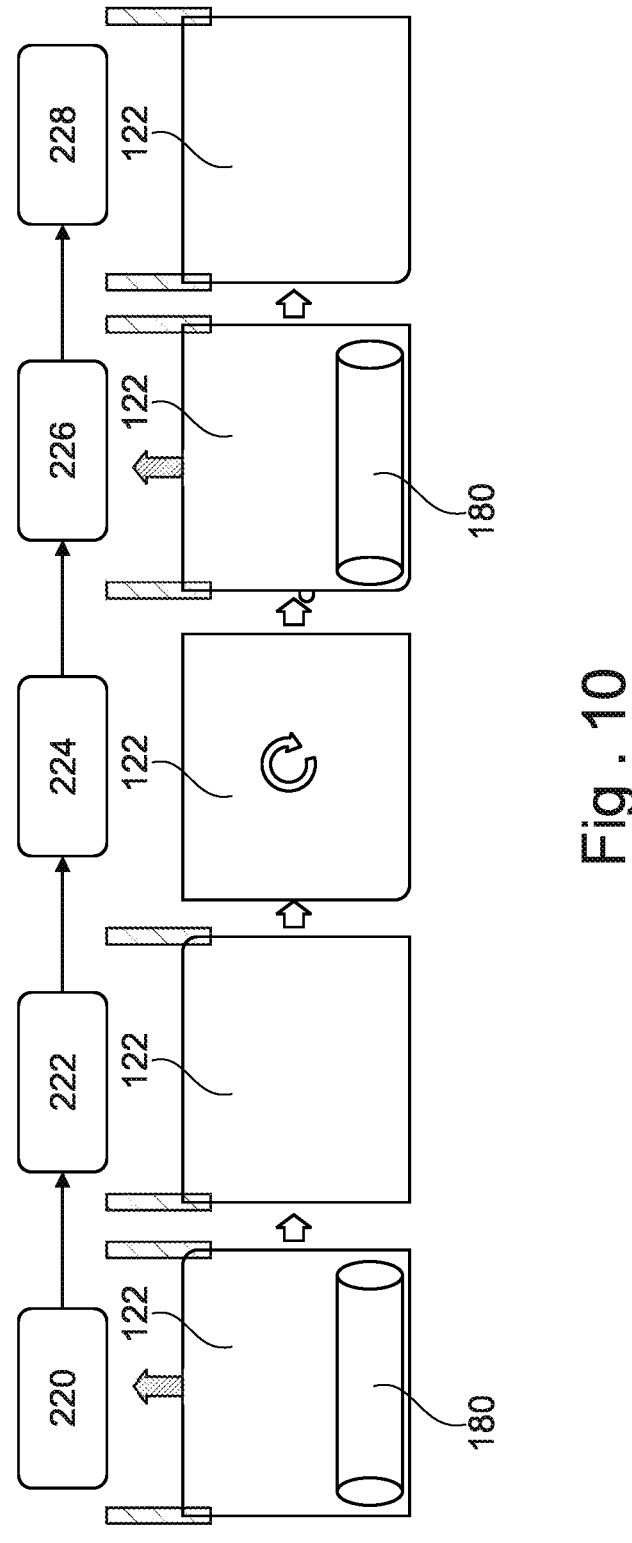
FIG. 10 illustrates an apparatus for manufacturing a component carrier with a plurality of different solder resists according to an exemplary embodiment of the disclosure.
Figures 11, 12, 17:
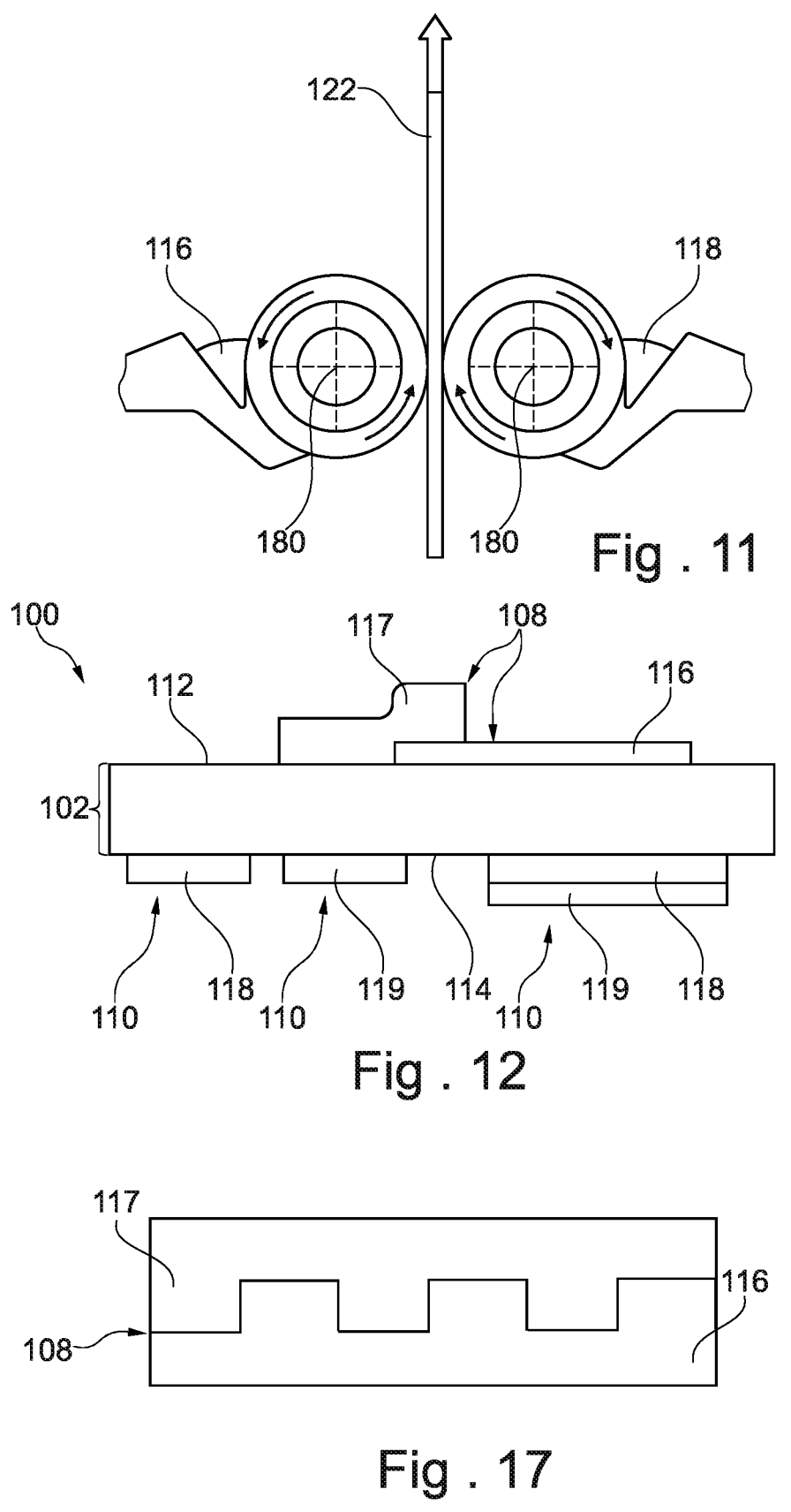

FIG. 10 illustrates an apparatus for manufacturing a component carrier 100 with a different solder resists 116, 117 according to an exemplary embodiment of the disclosure. FIG. 11 illustrates another apparatus for manufacturing a component carrier 100 with different solder resists 116, 117 according to an exemplary embodiment of the disclosure.

Now referring to the process flow shown in FIG. 10, a block 220 indicates a first coating of a panel-type component carrier preform 122 with a solder resist 116 using a roller 180.

A block 222 indicates a first baking stage at elevated temperature (for example 80° C. for 40 minutes).

A block 224 indicates panel rotation by 180°.

A block 226 indicates a second coating of the panel-type component carrier preform 122 with a solder resist 117 using a further roller 180.

A block 228 indicates a second baking stage.

FIG. 11 illustrates that roller coating can be carried out at the same time for both solder resists 116, 118 Advantageously, it may be possible to control two times solder resist application simultaneously. Hence, the thickness of the solder resists 116, 118 can be controlled individually and can be modified, if required or desired. Two times roller coating may mean that there can be four different thickness combinations.

FIG. 12 to FIG. 15 illustrate cross-sectional views of component carriers 100 with a plurality of different solder resists 116, 117, 118, 119 according to exemplary embodiments of the disclosure.

The embodiment of FIG. 12 differs from the embodiment of FIG. 1 in particular in that, according to FIG. 12, two different kinds of solder resist 116, 117 are provided on the first main surface 112 overlapping with each other. More specifically, solder resist 116 may be applied on stack 102 before solder resist 117 is applied. Solder resist 117 has a first part applied directly on the stack 102 and has a second part applied onto solder resist 116.

Preferably, there are no gas (such as air) inclusions between solder resist 116 and solder resist 117. This may be achieved by a proper parameter selection during the manu-facturing process. Alternatively, one or more cavities filled with gas (such as air) may be incorporated between portions of solder resists 116, 117. Said preferred and alternative configuration may be created also between solder resist 118 and solder resist 119.

A further difference can be seen on the second main surface 114. Here, different kinds of solder resist 118, 119 are arranged partially side by side on different surface portions of the second main surface 114. Apart from this, another portion of solder resist 119 is applied on another portion of solder resist 118, so that the latter portions form a solder resist stack with aligned ends.

Figures 13, 14, 15, 16:
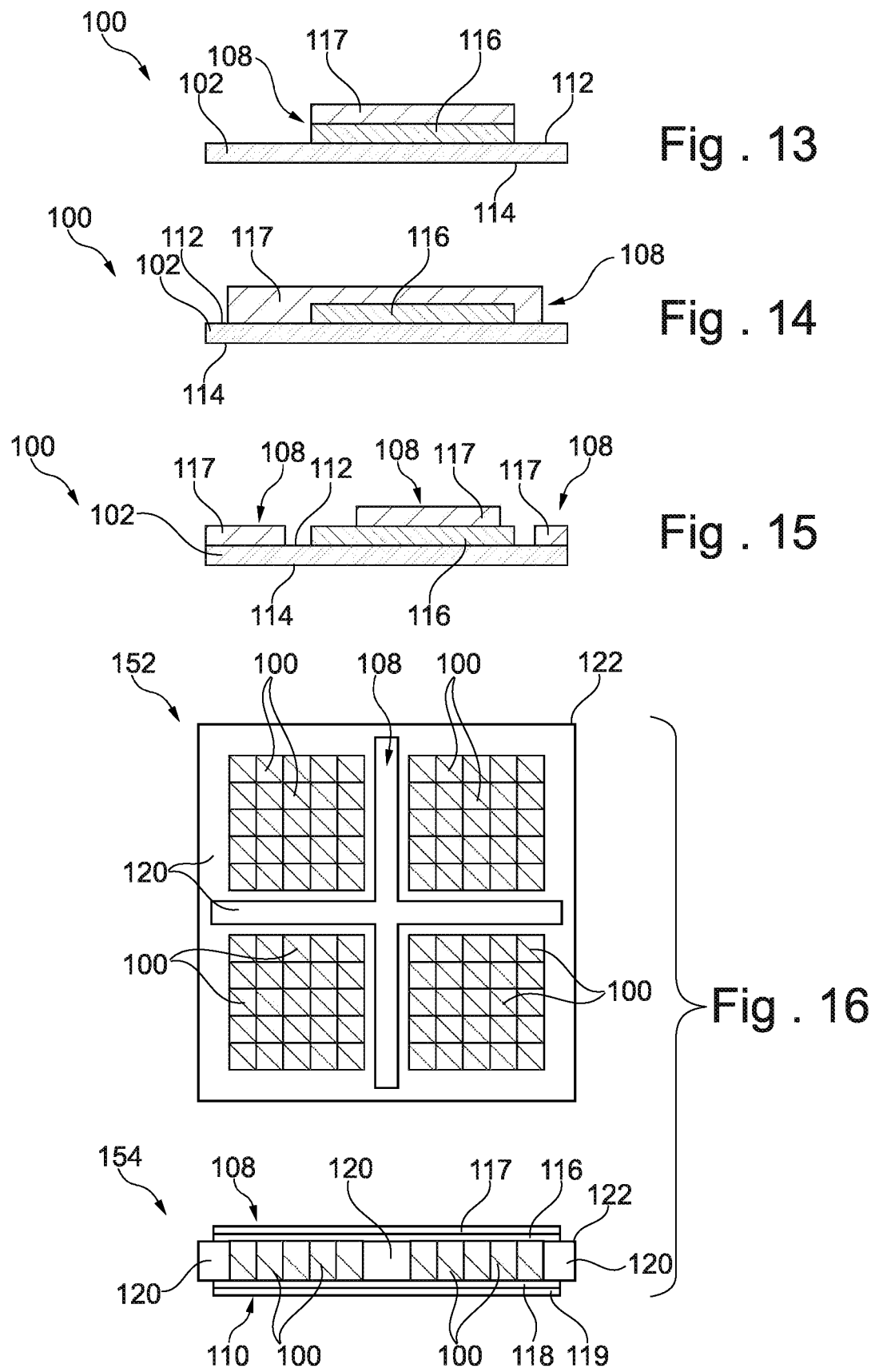

The embodiment of FIG. 13 differs from the embodiment of FIG. 1 in particular in that, according to FIG. 13, solder resists 116, 117 are only applied on the first main surface 112, whereas the second main surface 114 is free of solder resist. Solder resists 116, 117 are applied on top of each other so that said solder resists 116, 117 form a solder resist structure 108 embodied as a solder resist stack with aligned ends.

The embodiment of FIG. 14 differs from the embodiment of FIG. 13 in particular in that, according to FIG. 14, solder resist 117 is applied partially directly on stack 102 and partially on solder resist 116 being applied, in turn, completely on stack 102. The solder resist 117 has thus a larger lateral extension than solder resist 116.

The embodiment of FIG. 15 differs from the embodiment of FIG. 13 in particular in that, according to FIG. 15, solder resist 117 has three separate and mutually spaced portions. A first portion of solder resist 117 is formed directly on solder resist 116 being formed, in turn, directly on stack 102. Furthermore, solder resist 117 does not cover the entire surface, but only part of the surface, of solder resist 116. This may be adjusted by a corresponding pattern design. A second portion and a third portion of solder resist 117 are formed directly on stack 102, but separately from each other, separately from the first portion and separately from solder resist 116.

FIG. 16 illustrates a plan view 152 and a cross-sectional view 154 of a component carrier structure or component carrier preform 122 with component carriers 100 and with a front-sided solder resist structure 108 and a back-sided solder resist structure 110. The solder resist structure 108 comprises a solder resist stack of different solder resists 116, 117, whereas the solder resist structure 110 comprises a solder resist stack of different solder resists 118, 119. As shown in FIG. 16, the solder resist structures 108, 110 are located in a dummy region 120 of the component carrier preform 122. Thus, in the embodiment of FIG. 16, the solder resist structures 108, 110 are arranged in dummy region 120 of the component carrier preform 122 apart from the component carriers 100. Hence, the dummy region 120 may be used for optimizing warpage management and/or for balancing shrinkage.

Although not shown in FIG. 16, one or both solder resist structures 108, 110 may also be provided in the functional region of the component carrier preform 122, i.e., on the surfaces of the component carriers 100.

FIG. 17 illustrates a cross-sectional view of a solder resist structure 108 with engaging solder resists 116, 117 of a component carrier 100 according to an exemplary embodiment of the disclosure.

The illustrated solder resist structure 108 can be formed on any of two opposing main surfaces 112, 114 of a stack 102 of the component carrier 100 and comprises two different kinds of solder resists 116, 117. The engaging solder resists 116, 117 have mutual connection surfaces with inverse surface profiles. Advantageously, the interleaving solder resists 116, 117 have a proper mutual adhesion thanks to their cooperating tooth structures, or any other matching surface profile. Together, the engaging solder resists 116, 117 may have a rectangular shape in the shown cross-sectional view.

It should be noted that the term "comprising" does not exclude other elements or steps and the article "a" or "an" does not exclude a plurality. Also, elements described in association with different embodiments may be combined.

Implementation of the disclosure is not limited to the preferred embodiments shown in the figures described above. Instead, a multiplicity of variants are possible which variants use the solutions shown and the principle according to the disclosure even in the case of fundamentally different embodiments.

The invention claimed is:

1. A component carrier, comprising:
   a stack comprising at least one electrically conductive layer structure and/or at least one electrically insulating layer structure;
   a solder resist structure on at least one of two opposing main surfaces of the stack;
   wherein the solder resist structure, comprising at least two different kinds of solder resist, is provided on one of the two opposing main surfaces; and
   wherein the at least two different kinds of solder resist are at least two different solder resist materials or material compositions.

2. The component carrier according to claim 1, wherein the solder resist structure is formed on both opposing main surfaces of the stack.

3. The component carrier according to claim 1, wherein the solder resist structure, comprising at least two different kinds of solder resist, is provided also on the other one of the two opposing main surfaces.

4. The component carrier according to claim 1, wherein the solder resist structure comprises at least two different kinds of solder resist only on one of the two opposing main surfaces.

5. The component carrier according to claim 1, wherein thicknesses of the solder resist structure and/or of individual solder resists of the solder resist structure are different on the two opposing main surfaces.

6. The component carrier according to claim 1, wherein thicknesses of the at least two different kinds of solder resist are different.

7. The component carrier according to claim 1, wherein at least one dimension of the component carrier and/or a plurality of attributes of the solder resist structure is or are adjusted for improving at least one predefined property of the component carrier, when compared to a component carrier in which solder resist is absent on the two opposing main surfaces.

8. The component carrier according to claim 1, wherein the at least two different kinds of solder resist are stacked on each other.

9. The component carrier according to claim 1, wherein the at least two different kinds of solder resist are arranged at least partially side by side on different surface portions of at least part of one of the two opposing main surfaces.

10. The component carrier according to claim 1, wherein the at least two different kinds of solder resist overlap with each other.

11. The component carrier according to claim 1, wherein the at least two different kinds of solder resist comprise ink-type solder resist and dry film-type solder resist.

12. The component carrier according to claim 1, wherein the at least two different kinds of solder resist differ concerning at least one of mechanical strength, coefficient of thermal expansion, Young modulus, and color.

13. The component carrier according to claim 1, wherein a thickness of the solder resist structure is in a range from 1 μm to 50 μm.

14. A method of manufacturing a component carrier, comprising:

providing a stack comprising at least one electrically conductive layer structure and/or at least one electrically insulating layer structure;

forming a solder resist structure on at least one of two opposing main surfaces of the stack;

forming the solder resist structure on one of the opposing main surfaces with at least two different kinds of solder resist; and adjusting at least one dimension of the component carrier and/or adjusting a plurality of attributes of the solder resist structure for controlling at least one predefined property of the component carrier;

wherein the at least two different kinds of solder resist are at least two different solder resist materials or material compositions.

15. The method according to claim 14, wherein the method comprises adjusting material, thickness and/or spatial distribution of the solder resist structure for controlling warpage of the component carrier.

16. The method according to claim 14, wherein the method comprises adjusting the at least one dimension of the component carrier and/or adjusting the plurality of attributes of the solder resist structure for controlling warpage under consideration of a spatial distribution of material of the at least one electrically conductive layer structure.

17. The method according to claim 14, wherein the method comprises forming at least part of the solder resist structure in a dummy region of a component carrier preform apart from the component carrier.

18. The method according to claim 14, wherein the method comprises adjusting the at least one dimension of the component carrier and/or adjusting the plurality of attributes of the solder resist structure for balancing a solder resist distribution and/or for decreasing a shrinkage force of dielectric material of the component carrier during curing.

19. The method according to claim 14, further comprising:

virtually simulating said at least one predefined property of the component carrier;

virtually modifying the at least one dimension of the component carrier and/or the plurality of attributes of the solder resist structure for improving said at least one predefined property; and thereafter physically forming the component carrier with the modified at least one dimension and/or physically forming the solder resist structure with the modified attributes.

20. A component carrier, comprising:

a stack comprising at least one electrically conductive layer structure and/or at least one electrically insulating layer structure;

a solder resist structure on at least one of two opposing main surfaces of the stack;

wherein the solder resist structure, comprising at least two different kinds of solder resist, is provided on one of the two opposing main surfaces; and wherein the at least two different kinds of solder resist differ concerning at least one of mechanical strength, coefficient of thermal expansion, Young modulus, and color.

* * * * *